United States Patent [19]

Steyert et al.

[11] 4,360,569
[45] Nov. 23, 1982

[54] POROUS METAL HYDRIDE COMPOSITE AND PREPARATION AND USES THEREOF

[75] Inventors: William A. Steyert; Clayton E. Olsen, both of Los Alamos, N. Mex.

[73] Assignee: The United States of America as represented by the United States Department of Energy, Washington, D.C.

[21] Appl. No.: 129,535

[22] Filed: Mar. 12, 1980

[51] Int. Cl.$^3$ .................. B22F 3/10; C01B 6/00
[52] U.S. Cl. ................... 428/566; 75/200; 75/222; 423/248
[58] Field of Search ............ 55/74, 523; 75/222, 75/213, 200; 62/48; 428/566; 206/0.7, 0.6; 220/88 R; 423/248, 648 R

[56] References Cited

U.S. PATENT DOCUMENTS

| 2,671,953 | 3/1954 | Balke | 75/213 |
| 3,793,435 | 2/1974 | Reilly et al. | 423/248 |
| 4,036,944 | 7/1977 | Blytas | 55/74 |
| 4,110,425 | 8/1978 | Bühl et al. | 423/248 |
| 4,134,490 | 1/1979 | Turillon et al. | 206/0.7 |
| 4,310,601 | 1/1982 | Bernower | 428/566 |

OTHER PUBLICATIONS

"Metal Hydrides of Improved Heat Transfer Characteristics", Moshe Ron. Proc. 11th Intersociety Energy Conversion Engineering Conference, (Am. Inst. Chem. E., N.Y., 1976), 954–960.

"A Detailed Analysis of the Hydriding Characteristics of LaNi$_5$", (E. Ludin and F. E. Lynch., Proc. Tenth Intersociety Energy Conversion Eng. Conf., (Inst. E. & E. Eng., N.Y., 1975), 1380–1385.

"Hycsos: "D. M. Gruen et al., Proc. 11th Intersociety Energy Conversion & Eng. Conf., (Am. Inst. Chem. Eng., N.Y., 1976), 681–687.

"The Rate Limiting Processes for the Sorption of Hydrogen in LaNi$_5$", O. Boser et al., Proc. Tenth IECEC, 1363–1369, 1975.

*Primary Examiner*—L. Dewayne Rutledge
*Assistant Examiner*—John J. Zimmerman
*Attorney, Agent, or Firm*—Elizabeth O. Slade; Paul D. Gaetjens; Richard G. Besha

[57] ABSTRACT

A composite formed from large pieces of aggregate formed from (1) metal hydride (or hydride-former) powder and (2) either metal powder or plastic powder or both is prepared. The composite has large macroscopic interconnected pores (much larger than the sizes of the powders which are used) and will have a very fast heat transfer rate and low windage loss. It will be useful, for example, in heat engines, hydrogen storage devices, and refrigerator components which depend for their utility upon both a fast rate of hydriding and dehydriding. Additionally, a method of preparing the composite and a method of increasing the rates of hydriding and dehydriding of metal hydrides are also given.

19 Claims, No Drawings

POROUS METAL HYDRIDE COMPOSITE AND PREPARATION AND USES THEREOF

BACKGROUND OF THE INVENTION

This invention relates to a porous metal hydride composite and to methods of producing and using such a composite and relates in particular to a composite prepared from an interstitial hydride and to the preparation and uses thereof. It is a result, at least in part, of a contract with the Department of Energy (Contract W-7405-ENG-36).

Heat transfer by convection of gases is not often regarded to be a good method of transferring heat for intense power requirements, most gases generally acting as relative insulators because of their relatively low specific heat values and low thermal conductivity values. Thus, to transfer heat by convection of gases, large volumes of gas would generally have to be used in the heat transfer method, often accompanied by large windage losses (i.e., losses of energy in moving the large volumes of gas, windage loss being defined as pressure drop multiplied by volume flow rate). If windage losses for a system are high, heat transfer by convection is not practical.

Heat transfer by conduction through a solid such as a metal, on the other hand, can provide for rapid heat transfer from a hot body without the expenditure of having to move large volumes of gas past that hot body.

Hydrides are gaining interest as convenient means of storing hydrogen for fuel. The number of hydrogen atoms which can be stored per cubic centimeter is higher in a hydride than even in liquid hydrogen. However, recharging of hydrogen storage devices generally takes a long period of time, on the order of several hours. Thus, due to this long period, the usefulness of hydrides for hydrogen storage devices has often been limited, as has their use in devices such as heat engines and non-mechanical compressors and refrigerators, which are even more dependent than storage devices for their utility upon having a very fast heat transfer rate. The initial activation of hydride-formers by hydriding can take several days, during which the particles crumble into smaller pieces. However, this time period is unimportant for such devices when compared with the period required for subsequent rehydriding. It is the latter which is addressed in this specification, unless otherwise stated. Furthermore, even if this rate of rehydriding for a particular hydride device is initially very fast at the surface of the hydride-former, the hydriding reaction will stop unless the heat transfer rate of the device is sufficiently fast.

The article Moshe Ron, "Metal Hydrides of Improved Heat Transfer Characteristics," Proc. 11th Intersociety Energy Conversion Engineering Conference (Am. Inst. Chem. Eng., New York, 1976), 954–960, addressed the use of metal hydrides in hydrogen storage devices. There it was pointed out that heat must be removed and supplied in order that the hydriding and dehydriding reactions can proceed. The poor heat transfer of powdered metal hydrides was cited as a constraint on this use. Ron's solution was to form an aggregate described as a highly porous metal skeleton with metal hydride consolidated therein; and he described using the aggregate by providing the heat required for hydriding mainly by conduction of heat through the hydride, although a minor amount of heat is carried into the matrix by the hydrogen used for the hydriding. This aggregate according to Ron provides a containing means for the powdery metal hydride so as to prevent the hydride from dispersing; and simultaneously it provides a structure with certain improved heat transfer characteristics, including higher conductivity and higher heat diffusivity as compared with metal hydride powder without such a skeleton. Ron pointed out, however, that a difficulty to overcome is the crumbling of metal hydride particles caused by volume changes associated with the metal$\rightleftarrows$hydride reaction. And although his aggregate has a faster heat transfer rate than the powder, a composite capable of a much faster heat transfer rate was not furnished by the Ron reference. Neither did that reference furnish a method of producing such a composite having a much faster heat transfer rate nor the method of this invention of increasing the rates of hydriding and dehydriding of a metal hydride as compared with the rates obtained using prior art methods which employ heat transfer substantially only by conduction.

SUMMARY OF THE INVENTION

An object of this invention is a device which can use heat energy directly to compress a gas or to provide refrigeration or to convert heat energy to mechanical energy.

Another object of this invention is a stable hydrogen (and heat) storage device which does not significantly crumble upon being subjected to repeated hydride-dehydride cycling.

Another object of this invention is a method of producing a hydrogen (and heat) storage device capable of a very high rate of uptake of hydrogen during hydriding and a very high rate of discharge of hydrogen during dehydriding (i.e., rapid thermal equilibration and low impedance to gas flow).

Another object of this invention is a method of using such a device so as to obtain a high rate of total (i.e., conductive plus convective) heat transferred with low windage losses.

Yet another object of this invention is a method of increasing the rates of hydriding and dehydriding of a metal hydride.

A further object of this invention is a safety device for quickly and efficiently adsorbing tritium, for example in a tritium accident.

Additional objects, advantages, and novel features of the invention will be set forth in part in the description which follows and in part will become apparent to those skilled in the art upon examination of the following or may be learned by practice of the invention. The objects and advantages of the invention may be utilized and attained by means of the instrumentalities and combinations particularly pointed out in the appended claims.

To achieve the foregoing and other objects and in accordance with the purposes of the present invention, as embodied and broadly described herein, a highly porous metal hydride composite suitable for rapid and efficient convective heat transfer through the composite is formed by the method comprising: (1) encasing first powder particles (having an average largest linear dimension, a, after initial activation by hydriding) of a powdered metal hydride or a powdered metal hydride-former within a highly porous skeleton (which can be metallic or plastic) by mixing with the first powder small particles of a second powder, which can be either a metal or a plastic, and then treating the mixture so as to form a cohesive large aggregate mass; and (2) breaking that large aggregate mass into large pieces and randomly arranging the pieces, so that large interconnected pores exist between the macroscopic pieces of aggregate, the large interconnected pores having an average largest linear dimension, C, which is much greater than a. In a preferred embodiment, C is greater than about 100 μm.

Also according to the invention, the thus-produced composite comprises particles of a first powder which can be metal hydride(s) and/or metal hydride-former(s) having after initial activation by hydriding an average largest linear dimension, a, each particle of which is encased within a cage of interconnected small particles of metal and/or plastic, and wherein a plurality of such cages are interconnected to form a macroscopic segment of aggregate, the composite comprising a plurality of such aggregates in a random array, the macroscopic segments of aggregates having void spaces therebetween wherein the void spaces have an average largest linear dimension, C, which is much greater than a. In a preferred embodiment, C is greater than about 100 μm.

Further, according to the invention in a preferred embodiment, the composite comprises a powdered interstitial metal hydride, each particle of which is encased within a cage of sintered small particles of a ductile metal having a relatively high thermal conductivity value.

Further according to the invention, in a preferred embodiment of the method of preparing the composite, graphite is mixed with a ductile metal and with the metal hydride in the hydrided (not dehydrided) state so as to produce a composite in which the hydriding material is not blinded by (i.e., not completely surrounded by and thus cut off from the hydrogen by) the metal which forms the matrix.

Further, according to the invention, the thus-produced composite is used in a heat storage and hydrogen storage device in which the rates of hydriding and dehydriding will be much faster than those of prior art devices which depend mainly upon conduction for heat transfer by using hydrogen gas both as the major medium of heat transfer and to form the hydride.

Also according to the invention, the produced composite can be used as the heat transfer material in a refrigerator.

Further according to the invention, the produced composite can be used to adsorb tritium.

Also according to the invention, a method for increasing the rates of hydriding of a metal hydride-former and dehydriding of a metal hydride as compared with the rates obtained using prior art methods which can employ heat transfer through the hydride substantially only by conduction comprises:

(a) forming a composite by
 (1) encasing particles (having an average largest linear dimension, a) of a first powder which can be metal hydride(s) and/or metal hydride-former(s) within a highly porous skeleton (which can be metallic or plastic) by mixing with the first powder small particles of either metal or plastic or both and then treating the mixture, so as to form a cohesive large aggregate mass; and
 (2) breaking that large aggregate mass into pieces and arranging the pieces in a random array so that large interconnected pores exist between the macroscopic pieces of aggregate, the pores having an average largest linear dimension, C, which is much greater than a; and then (b) passing hydrogen gas through that composite in sufficient quantity to
 (1) hydride or dehydride the composite and
 (2) to supply or remove by forced convection substantially all heat required for hydriding and for dehydriding.

Based upon calculations described in the *Experimental Demonstration* below, the composite according to the invention will satisfy the objects cited above and will exhibit the following combination of advantages. It will adsorb hydrogen (or deuterium or tritium) very rapidly at a relatively low temperature and pressure and will then release the gas at a higher gas pressure upon being heated to a higher temperature. The composite is quite stable and does not break down upon repeated hydride-dehydride cycling (as described below), tests having shown stability through 30 cycles. Because the rates of both hydriding and of dehydriding of this composite will be much higher than those of the composites described in the Ron reference, this composite will be much more usful in a hydrogen compressor, heat engine, and refrigerator, all of which require very fast rates of hydriding and dehydriding. Because the surface area of the large aggregate particles making up the composite is accessible to the large quantities of flowing hydrogen used for convective heat transfer, heat transfer by convection is increased to an acceptable level; and a much faster flow of hydrogen and heat will be obtained. Additionally, because the composite of this invention has both microscopic interconnected pores within each large piece of aggregate and macroscopic interconnected pores between the large pieces of aggregate, the disadvantages of either fine or coarse porosity alone are avoided; and an optimized system is achieved. This is in contrast to a prior art aggregate such as in the Ron article which has only microscopic pores and which would experience huge pressure drops if convective heat transfer through his aggregate were attempted. When the hydride-forming reaction is exothermic, heat must be removed or the reaction will stop. Therefore, because heat will be removed very rapidly by the gas flow through the large pores in the composite, the hydride-forming reaction (when exothermic) will be further enhanced.

Because the preferred method of using the composite comprises transferring heat for hydriding and dehydriding mainly by forced convection through the composite (instead of mainly by conduction of heat through metal encasing the metal hydride as in the Ron article), the second powder material need not be a conductor but can be an insulator such as plastic, if desired. Therefore a much wider range of materials (some of which may be lightweight and/or relatively inexpensive) is available for use in the practice of this invention than was available in the aggregate prepared in the Ron article.

Furthermore, when the composite has metal as the second powder material, the composite has been shown to have an acceptably high conductivity value, as described in the *Experimental Demonstration* below. Thus, if that composite is located within an external chamber, in order to drive off adsorbed tritium (which is corrosive to certain chamber walls) the composite itself can (if desired) be heated by a flow of an electric current through the aggregate, instead of by heating its container; and thus corrosion of the external chamber would be minimized and there would be no chance of rupturing the container. Likewise, hydrogen and deuterium can be driven off by electrical heating, if desired.

When using this composite, because windage losses will be quite low, one need not expend large amounts of energy in forcing the hydrogen through even very large thicknesses of the composite. Furthermore, when using the composite in a heat engine, if desired no external source of pressure will need be used at all.

DESCRIPTION OF THE PREFERRED EMBODIMENTS

The method of preparing the composite according to the invention comprises the following essential steps. The first step is to mix two types of powders, a first powder and a second powder, (described below) which are microscopic in size in particular relative proportions (described below), with or without a particular binder, (as described below). Step 2 is to treat the mixture prepared in step 1 by sintering and/or by applying pressure at a particular combination of conditions (described below) so as to form a cohesive large aggregate mass having microscopic interconnected pores within. Step 3 is to break up the large aggregate mass formed in step 2 into relatively large, macroscopic pieces, as described below. Then, in step 4, this plurality of large pieces of aggregates is arranged so that the large pieces are in a random array and so that large macroscopic interconnected pores exist between the large pieces of aggregate. This structure then is the composite of the invention. Preferably, in order to maintain the large pores, the large pieces of aggregate will be sintered in a final step.

The first type of powder which is used to prepare the composite of the invention can be any metal hydride or material which forms a metal hydride; and, so long as it is used in the method of preparing the composite outlined above, a very fast rate of hydriding and dehydriding is expected to occur. However, when the first powder is an interstitial hydride-former (which expands by a factor less than 1 upon hydriding), as opposed to a saline hydride-former (which expands by a factor of at least about 2), instead of forming a reaction layer which can crumble, hydrogen can penetrate far into the first powder and react within the powder (not only at the surface of the powder). Therefore, in order to maintain the stability of the composite during repeated cycling, it is preferred to use an interstitial hydride or hydride-former. An interstitial hydride (or hydride-former) is furthermore preferred over a saline hydride (or hydride-former) because it will dehydride (or hydride) faster than a saline hydride (or hydride-former). Examples of suitable interstitial hydride-formers are $LaNi_5$, $CaNi_5$, and $LaNi_{5-x}Al_x$.

The volume amount of first hydride powder can be chosen as desired. The volume amounts of the second powder (described below) and (if used) the binder will be adjusted accordingly to achieve a particular proportion of first powder:second powder, as described below.

The size of the particles of first powder can vary over a relatively broad range. However, because it is desired to maximize the rates of hydriding and dehydriding of a given weight of the composite, the size (i.e., largest linear dimension of) the first powder will generally be smaller than about 40 $\mu$m. And, preferably, the size of the first powder will be about 8 $\mu$m after initial activation when the first powder is $LaNi_5$ because it has been found that when the particles of $LaNi_5$ are that small they are fine enough so that they will disintegrate only slightly during repeated hydridedehydride cycling. (This finding was reported in the reference C. E. Lundin and F. E. Lynch, "A Detailed Analysis of the Hydriding Characteristics of $LaNi_5$," Proceedings of the Tenth Intersociety Energy Conversion Engineering Conference (Institute of Electrical and Electronic Engineering, New York, 1975), 1380.) To achieve a size of about 40 $\mu$m or smaller, grinding of the first powder generally will be required. This grinding can be done by any suitable method.

Additionally, if desired, so as to improve the rates of hydriding and dehydriding, the first powder can be subjected to a pretreatment step comprising coating at least a part of the surface area of the first powder particles with palladium metal.

The first powder can be mixed with the second powder when the first powder is either in the hydrided or dehydrided state. However, it is preferred to use the first powder in the already hydrided state so that subsequent breakage of the composite during hydride-dehydride cycles will be minimized, (the hydrided powder occupying a larger volume than the dehydrided powder).

The second powder, which is mixed with the first powder, can be selected from a broad number of types of materials. However, in order for the composite to have a long lifetime, the second powder must be substantially inert to the material with which it is to be mixed. Furthermore, it must have a melting point which is higher than the highest temperature to which the composite will be routinely subjected. Any metal or plastic (i.e., polymeric material of large molecular weight which can be shaped by flow) or suitable mixture of metals or mixtures of plastics or mixtures of metal(s) and plastic(s) which satisfies these requirements can be used in the practice of the invention to prepare the composite. If it is desired to supply some heat through the composite by conduction, a metal will generally be used as the second powder. Then, the metal should be chosen so that it is ductile and so that it also has a high conductivity value. Of the metals available, it has been found that copper will tend to poison the hydriding reaction, whereas aluminum will tend to enhance that reaction. However, it has been found that aluminum (and copper to a lesser extent) will react with the hydride-former $LaNi_5$ when a mixture of $LaNi_5$ with copper is sintered at about 600° C. or with aluminum at 300° C. Therefore, if aluminum and $LaNi_5$ or copper and $LaNi_5$ are used, some deterioration of the $LaNi_5$ is to be expected. It has been found that the ductile metal lead does not react to a significant extent with $LaNi_5$. With lead, sintering at 200° C. has been found to form a suitable stable, unpoisoned composite. Therefore, lead is preferred to both copper and aluminum when $LaNi_5$ is used.

The size of particles of the second powder will be chosen such that they are smaller than or somewhat comparable in size to the size of the particles of first powder after the hydride has been initially activated. This is important for the formation of cages around the particles of first powder which will be permeable to hydrogen yet which will contain the hydride powder. When $LaNi_5$ is the first powder, the particles of the second powder shoulder be smaller than 30 $\mu$m in order to contain the activated hydride powder which fractures to 8 $\mu$m during activation.

The volume of the second powder relative to the volume of first powder should be chosen so that, upon treating the mixture to form a large cohesive aggregate mass, a permeable cage of particles of the second powder will surround each particle of the first powder. Generally, this volume will be within the range from about ½ to about 1½ cc. for each cc. of first powder which is used.

If desired, a binder material can be mixed with the first powder and with the second powder. This binder operates, together with the second powder, to form small cages around the particles of the first powder; and it serves to improve the pentration of hydrogen into the first powder by forming layers through which hydrogen can penetrate. When the second powder comprises plastic, the use of a binder is especially important because hydrogen will penetrate a suitable binder much better than it will penetrate plastic.

A suitable binder is any material having a layered structure along the layers of which hydrogen can permeate or diffuse and with which hydrogen will not react to any appreciable extent. This category includes, for example, certain clays and graphite. Graphite in the form of flake graphite was used in the Experimental Demonstration below and gave good results.

The amount of binder material to be used can vary widely, but generally the relative volumes of binder; first powder will be within the range from about 1:5 to about 1:20.

As outlined above, after the powders are mixed in the appropriate amounts, the mixture of powders is treated so as to form a cohesive large aggregate mass. This treatment can be either sintering (i.e., forming a cohesive bonded mass by heating the powders without melting), applying pressure, or a combination of both. The use of sintering of the powders with or without applying pressure is preferred, however, so as to provide a strong structure. When metal is used as the second powder, the temperature (measured in °K) of sintering will generally be about 70 to about 90% of the melting temperature (in °K) of the second powder; and preferably, it will be about 80%. And in particular, when lead is the second powder, the sintering temperature will be within the range from about 180° to about 250° C.

When the second powder is plastic, the powders should be very briefly heated to a sufficiently high temperature to melt the plastic only very slightly so as to bond the particles of plastic, yet to retain the penetrability to the first powder. And when the second powder is a mixture of plastic and metal, the temperature will be the temperature used when plastic alone is present (as described above).

The time of sintering will generally be several hours or longer.

Other conditions of sintering which should be used are either a sintering atmosphere of pure hydrogen or an applied high vacuum, the former alternative being preferred because it will keep the surface of the second powder oxide-free for better sintering.

The third step in the preparation of the composite, as outlined above, is to break up the sintered mass into relatively large pieces of aggregate. The sizes of these large pieces can be chosen from a broad range of sizes, provided that large pores between the large pieces of aggregate are obtained. The sizes of the large pieces of aggregate will often be within the range from about 200 $\mu$m to about 1000 $\mu$m. When the second powder comprises metal, the sizes of the large pieces of aggregrate will often be quite large, for example, about 1000 $\mu$m. However, when the second powder comprises plastic, an aggregate size of about 300 $\mu$m or smaller will be used because the thermal conductivity of plastic is significantly less than that of metal and hence short conductive heat transfer paths through the individual pieces of aggregate are required. Likewise, the shapes of the large pieces of aggregate are important only insofar as they provide large pores between the large pieces of aggregate.

As stated above, the pores between the large pieces of aggregate are required to be large relative to the sizes of the powders used to make the composite. Generally, this pore size will be greater than about 100 $\mu$m.

Additionally, the pore volume of the composite will be generally within the range from about 20 to about 60 volume percent. A pore volume less than about 20% generally will not allow good movement of the large required volumes of hydrogen through the composite, and a pore volume greater than about 60% will generally result in an unstable structure and a poor packing fraction.

In the next step in preparing the composites, the large pieces of aggregate are randomly arranged. For example, they can be poured randomly into a container of desired shape. Next, if desired, they can be compacted by shaking or applying pressure, provided that mechanical breakage of the pieces of aggregate is minimal. Then, if desired, in order to provide mechanical stability, the large pieces of aggregate can be sintered together as was described above in step 1 for sintering the first powder and second powder. Thus, a stable structure of the desired shape is formed.

The composite prepared according to the invention can be used in any method based upon the reaction of a relatively dehydrided composite with hydrogen so as to form the hydride, or conversely upon the reaction of the hydrided material as it breaks down to the dehydrided form and to hydrogen. Any such use of the composite is within the scope of this invention, particularly when the hydrogen gas used for hydriding (or, conversely, the hydrogen gas released in dehydriding) also serves as the major medium of heat transfer (wherein the heat referred to here is the heat of hydriding or the heat released on dehydriding). Thus, the composite can be used for example as a heat engine component, as a refrigerator component, as a hydrogen storage device, as a heat storage device, and as a pressurizer by forming the composite from a type of metal hydride or metal hydride-former which gives off heat when it reacts with hydrogen to form the hydride. Such a material will form the corresponding hydride at a relatively low temperature and low pressure; and the hydrogen gas which is passed through the composite will serve also to remove the heat given off in the exothermic reaction so that the hydride-forming reaction will not stop. Then, once the hydride has been formed, when it is raised to a sufficiently high temperature, the hydrided form will break down to the dehydrided form, releasing hydrogen at a relatively high pressure (the high pressure gas then being useful for doing work, for example in a turbine or piston or compressor of a refrigerator). The heat required for the dehydriding reaction is preferably passed into the composite by heated hydrogen gas which is recycled in a closed system, the heat being furnished by any suitable source, for example by solar energy. Thus, it can be seen that the composite can act as a heat engine component, as a refrigerator component, as a hydrogen storage device, as a heat storage device, and as a pressurizer.

The above-described devices are, thus, capable of converting heat energy to mechanical energy. Furthermore, because the reactive surface area of the hydride is so large, the hydride-forming ability of the composite has been practically maximized, whereas the weight of the composite has been practically minimized. Thus, the hydrogen storage device described above is very efficient in its use of a given weight of the hydride material.

Similarly, the composite can be used to collect tritium which may be released in a tritium spill, for example. The composite will react very quickly with tritium to form a tritide.

EXPERIMENTAL DEMONSTRATION

Although a complete example directly illustrating the use of the composite with forced convection is not available, a composite according to the invention was prepared and was subjected to various tests which are correlatable with that use.

The first powder which was used was LaNi$_5$ which was prepared by arc melting in an argon atmosphere; and the type of second powder which was used was copper powder. However, it is believed that the already material and lead powder will actually give better results. In this example, small particles of graphite (called Superflake graphite and obtained from Superior Graphite Co.) were used to bind the composite together.

In a drybox operation (i.e., in an enclosed space using an argon atmosphere), LaNi$_5$ was crushed and screened to obtain 300 mesh particles and smaller. These were next further crushed by ball milling and were then sieved to obtain particles of powder having a largest dimension of 30 $\mu$m (500 mesh and smaller). These particles were fine enough so that they disintegrated only slightly during repeated hydride-dehydride cycling. A weight of 31.37 grams of this LaNi$_5$ powder (occupying a volume of 3.78 cc) was then mixed with 37.68 grams (4.21 cc) of much finer copper powder (obtained from Sherritt-Gordon Co. and described as 1 $\mu$m Cu powder), which had been previously sieved so as to remove and discard agglomerates of copper powder larger than 60 $\mu$m (325 mesh and smaller). The majority of copper powder particles were about 1 $\mu$m in size. Also included was 0.95 grams (0.45 cc) of the graphite described above, which was further screened so as to obtain and use graphite particles no larger than 325 mesh.

These three ingredients in the amounts described were thoroughly mixed using standard means. At this point, the mixture comprised 45 volume percent (v/o) LaNi$_5$, 50 v/o Cu, and 5 v/o graphite, as determined by the initial weights and the known densities of the materials used.

Next, a first portion (14.7 g.) of this mixture was subjected to a small unknown pressure for 1 minute without external heating (which is used in sintering); and a second portion (14.7 g.) of the mixture was subjected to 2 tons per square inch pressure (tsi) for 1 minute. The two pressings were next crushed, combined, and screened to provide large aggregates of sizes ranging from 20 to 60 mesh. These aggregates were then randomly poured into a mold and were then pressed at 2 tsi for 1 minute, thus forming a block 1 inch×3 inch×2 mm. This block was next sintered by placing it into a hydrogen atmosphere at 600° C. for one hour, preceded and followed by a heat up and cool down in argon for a total period of several hours. The sintered composite (weighing 14.2 g, of which 6.4 g was the weight of the hydride-former) had a thickness of 2 mm, a length of 3 in., a width of 1 in., and a density which was 53% of the theoretical density (i.e., the void space was 47%). The weight composition of the final product was 45 w/o (weight percent) LaNi$_5$, 54 w/o Cu, and 1 w/o graphite. It had an interconnected porosity with an average pore size between the large pieces of aggregate of about 100 $\mu$m, as determined by low magnification photography. It is believed that pores larger than 100 $\mu$m (which are desired) were not obtained due to crushing of the large aggregates. If the powders had been initially sintered together rather than merely pressed together, it is believed that the sintering would probably have formed structurally stronger large aggregates.

The sample was then cut into two $\frac{1}{2}''\times 3''\times 2$ mm pieces, and one piece weighing 7.04 g. was subjected to the following tests. Its specific heat was measured as 0.368 Joule/g. °K. (whereas the calculated value was 0.37 J/g. °K.), based upon the known specific heats of copper (0.37 J/g. °K.), LaNi$_5$ (0.33 J/g. °K.), and graphite (0.71 J/g. °K.). It was initially activated by hydriding at 21° C. by placing the sample in a hydrogen atmosphere at 100 psi pressure for a period of 2 days without use of a pump to force H$_2$ through the composite. It is believed that a larger activation pressure would have resulted in a greater percentage of hydriding. The electrical resistivity was next measured to be 350 $\mu\Omega$-cm. Then, the sample was electrically heated at 7.8 W/cm$^2$ by applying a current of 100 amps along the 3 inch length of the composite; and about 35 percent of the hydrogen in the composite was expelled in two seconds. The amount of hydrogen expelled was determined by measuring pressure changes of gas contained within a 29 cc. gas cell.

Although the heat of dehydriding was not actually furnished by forcing hot hydrogen gas through the sample, thus using convective heat transfer, the fact that this percentage of the hydrogen in the composite was expelled in so short a time period through the large interconnected pores of the composite indicates that the convective heat transfer rate capability of that composite is also very fast. Furthermore, because the rate of hydriding is governed by the heat transfer rate, a very fast convective heat transfer rate capability of the composite will result in a very fast rate of hydriding when the heat transfer is by forced convection of hydrogen through the composite. That is, provided that the heat of hydriding is removed within a short but not extremely short time period (for example, longer than about 1 second but shorter than about 11 seconds), there is no doubt that substantially complete hydriding of the composite will take place within that short time period. Support for this position is found in the Lundin and Lynch article cited above.

The sample was subjected to 30 hydriding-dehydriding cycles (wherein the sample was hydrided by convection, but not forced convection, and dehydrided by electrical heating) as described above. It maintained its mechanical integrity during these cycles. The composite could have been used in further cycles.

Calculations of the heat transfer rate by forced convection through a bed of spherical particles may be useful in providing a rough estimated calculation of the heat transfer rate by forced convection through the composite of the invention. Likewise, the windage loss of the composite can be estimated from such calculations. These calculations for forced convection through spherical particles are described in W. A. Steyert, "New Heat Transfer Geometry for Hydride Heat Engines and Heat Pumps," Los Alamos Scientific Laboratory Report LA-7822, (July 1979), especially in the second footnote on page 2 of that report. These calculations are based on actual measurements of heat transfer coefficients and pressure drops in copper particle beds described in W. A. Steyert, "Heat Transfer and Flow Friction in Fine Porous Media," Los Alamos Scientific Laboratory Report LA-6912-MS, (September 1977). Those reports are hereby incorporated by reference into this specification. The results of the calculations for forced convection through the spheres described in that report are a heat transfer rate of 85,000 W/K-m$^2$ and a windage loss of only 2500 W/m$^2$ of the bed. It is believed that the heat transfer rate of the composite of the invention using forced convection would be at least about one-half of the calculated value and that the windage loss would be no more than two times the calculated value.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A composite comprising:
 a plurality of aggregates arranged in a random array so that interconnected large pores having an average largest linear dimension C exist between individual aggregates, each of said aggregates comprising:
 (a) first powder particles comprising particles of an interstitial metal hydride and having an average largest linear dimension a after initial activation by hydriding, and
 (b) second powder particles comprising lead powder, wherein said first powder particles are separated from each other by said lead powder,
 wherein said first powder particles are substantially inert to said lead powder,
 wherein said lead powder forms permeable cages around said first powder particles, a plurality of said cages forming one of said aggregates,
 wherein C is at least about 100 μm, and wherein C is much greater than a.

2. A composite according to claim 1, wherein said plurality of aggregates have a volume of inner void space between said aggregates which is within the range from about 20 to about 60% of the total volume occupied by said plurality of aggregates and wherein said first powder particles have at least a partial coating of palladium metal.

3. A composite according to claim 2 wherein said second powder particles are sintered together so that they form permeable cages around said first powder particles.

4. A composite according to claim 3 or claim 1, wherein said aggregates comprise also a binder material which is substantially unreactive to hydrogen and which has a layered structure along the layers of which hydrogen can permeate.

5. A composite according to claim 4, wherein said binder comprises graphite and wherein said first powder particles comprise LaNi$_5$.

6. A composite according to claim 5, wherein said plurality of aggregates is sintered so as to form a relatively rigid structure and wherein said plurality of aggregates has an inner volume of void space between said aggregates lying within the range from about 40 to about 50 vol% of the total volume occupied by said plurality of aggregates.

7. A method of forming a highly porous metal hydride composite comprises:
 (a) mixing together (1) first powder particles comprising at least one material selected from the group consisting of interstitial metal hydrides and interstitial metal hydride-formers, said first powder particles having an average largest dimension after initial activation by hydriding, a, and (2) second powder particles which are lead powder, wherein said first powder particles are separated from each other by said lead powder, wherein said first powder particles are substantially inert to said lead powder, and wherein said lead powder forms permeable cages around said first powder particles, so as to form a first mixture;
 (b) treating said first mixture so as to form a cohesive large aggregate mass;
 (c) breaking said large aggregate mass into pieces of aggregate;
 (d) arranging said pieces of aggregate in a random array so as to form a composite having large interconnected pores located between said pieces of aggregate,
 wherein said large interconnected pores have an average largest linear dimension, C, which is at least about 100 μm and which is much greater than a.

8. A method according to claim 7, wherein said pieces of aggregate have a volume of inner void space between said pieces of aggregate which is within the range from about 20 to about 60% of the total volume occupied by said pieces of aggregate and wherein said first powder particles have at least a partial coating of palladium metal.

9. A method according to claim 8, wherein said first mixture is sintered so as to form a cohesive large aggregate mass.

10. A method according to claim 9, wherein said first mixture comprises also graphite as a binder and wherein said first powder particles comprise LaNi$_5$.

11. A method for increasing the rate of hydriding of a metal hydride-former and increasing the rate of dehydriding of a ductile metal hydride comprises:
 (a) forming a composite by:
 (1) mixing together (1) first powder particles of at least one material selected from the group consisting of metal hydrides and metal hydride-formers with (2) second powder particles of at least one material selected from the group consisting of metals and plastics, so as to form a first mixture;
 (2) treating said first mixture so as to form a cohesive large aggregate mass;
 (3) breaking said large aggregate mass into pieces of aggregate; and
 (4) arranging said pieces of aggregate in a random array so that large interconnected pores exist between said pieces of aggregate, said pores having an average largest linear dimension C greater than about 100 μm; and then (b) passing hydrogen gas through said composite in sufficient quantity to both (1) perform at least one function selected from the group consisting of hydriding and dehydriding said composite and (2) perform at least one function selected from the group consisting of supplying and removing by forced convection substantially all heat required for hydriding and for dehydriding.

12. A method according to claim 11, wherein said first powder particles comprise at least one material selected from the group consisting of interstitial metal hydrides and interstitial metal hydride-formers and wherein said second powder particles comprise at least one second material selected from the group consisting of ductile metals.

13. A method for increasing the rate of hydriding of a metal hydride-former and increasing the rate of dehydriding of a ductile metal hydride comprises:

(a) forming a composite by:
  (1) mixing together (i) first powder particles comprising at least one material selected from the group consisting of interstitial metal hydrides and interstitial metal hydride-formers and wherein said first powder particles have at least a partial coating of palladium metal thereon with (ii) second powder particles comprising at least one second material which is lead, so as to form a first mixture;
  (2) treating said first mixture so as to form a cohesive large aggregate mass;
  (3) breaking said large aggregate mass into pieces of aggregate; and
  (4) arranging said pieces of aggregate in a random array so that large interconnected pores exist between said pieces of aggregate, said pores having an average largest linear dimension C greater than about 100 μm; and then (b) passing hydrogen gas through said composite in sufficient quantity to both (1) perform at least one function selected from the group consisting of hydriding and dehydriding said composite and (2) perform at least one function selected from the group consisting of supplying and removing by forced convection substantially all heat required for hydriding and for dehydriding, wherein said pieces of aggregate have a volume of inner void space between said pieces of aggregate which is within the range from about 20 to about 60% of the total volume occupied by said pieces of aggregate.

14. A method according to claim 13, wherein said second powder particles comprise at least one ductile metal and wherein said first mixture is sintered so as to form a cohesive large aggregate mass.

15. A method according to claim 14, wherein said first mixture comprises also graphite as a binder and wherein said first powder particles comprise LaNi$_5$.

16. A method of collecting tritium in a tritium spill, said method comprising passing said tritium by forced convection through a composite according to claim 1.

17. A refrigerator having a heat transfer material comprising a composite according to claim 1.

18. A heat engine having a heat transfer material comprising a composite according to claim 1.

19. A hydrogen compressor having a heat transfer material comprising a composite according to claim 1.

* * * * *